United States Patent
Tyan et al.

(10) Patent No.: US 9,889,887 B2
(45) Date of Patent: Feb. 13, 2018

(54) TWELVE-CORNERED STRENGTHENING MEMBER FOR A VEHICLE WITH STRAIGHT AND CURVED SIDES AND AN OPTIMIZED STRAIGHT SIDE LENGTH TO CURVED SIDE RADIUS RATIO

(71) Applicant: FORD GLOBAL TECHNOLOGIES, LLC, Dearborn, MI (US)

(72) Inventors: Tau Tyan, Northville, MI (US); Yu-Kan Hu, Ypsilanti, MI (US); Leonard Anthony Shaner, New Baltimore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/001,668

(22) Filed: Jan. 20, 2016

(65) Prior Publication Data

US 2017/0203790 A1    Jul. 20, 2017

(51) Int. Cl.
  *B62D 21/15*    (2006.01)
  *B60R 19/26*    (2006.01)
  (Continued)

(52) U.S. Cl.
  CPC ............... *B62D 21/15* (2013.01); *B60R 19/26* (2013.01); *B62D 29/008* (2013.01); *B62D 29/046* (2013.01); *B62D 21/152* (2013.01)

(58) Field of Classification Search
  CPC ......... B60R 19/24; B60R 19/26; B60R 19/34; B62D 21/02; B62D 21/15; B62D 21/152; B62D 21/155; B62D 25/08; B62D 25/085
  (Continued)

(56) References Cited

U.S. PATENT DOCUMENTS 2,205,893 A    6/1840    Unger
1,951,292 A    3/1934    Cahill
(Continued)

FOREIGN PATENT DOCUMENTS

CN    104443039 A    3/2015
CN    104763772 A    7/2015
(Continued)

OTHER PUBLICATIONS

Extended European Search Report for Application No. 15195185.2, dated May 19, 2016.
(Continued)

*Primary Examiner* — Jason S Daniels
(74) *Attorney, Agent, or Firm* — Jones Robb, PLLC; Jason Rogers

(57) ABSTRACT

A strengthening member for a vehicle, a vehicle including a strengthening member, and a method of making a strengthening member for a vehicle is provided. The strengthening member can have a twelve-cornered cross section that includes sides and corners. The sides can include eight straight sides and four curved sides. A length of each straight side can be substantially the same, a radius of a curvature of each curved side can be substantially the same, and a ratio of the straight side length to the curvature radius may range from about 0.9 to about 1.6. In a motor vehicle, length of each straight side of the cross section of the strengthening member can range from about 10 mm to about 200 mm and the radius of the curvature of each curved side of the cross section of the strengthening member can range from about 3 mm to about 400 mm.

20 Claims, 8 Drawing Sheets

(51) Int. Cl.
  *B62D 29/00* (2006.01)
  *B62D 29/04* (2006.01)
(58) Field of Classification Search
  USPC ............ 296/187.03, 187.09, 193.09, 203.01, 296/203.02, 205; 293/132, 133
  See application file for complete search history.

(56) References Cited

U.S. PATENT DOCUMENTS

| | | | |
|---|---|---|---|
| 2,340,003 A | 1/1944 | McDermot | |
| 2,837,347 A | 6/1958 | Barenyi | |
| 2,856,226 A | 10/1958 | Purdy | |
| 3,092,222 A | 6/1963 | Heinle | |
| 3,209,432 A | 10/1965 | Cape | |
| 3,366,530 A | 1/1968 | Kodich | |
| 3,412,628 A | 11/1968 | De Gain | |
| 3,930,658 A | 1/1976 | Howe et al. | |
| 3,964,527 A | 6/1976 | Zwart | |
| 4,018,055 A | 4/1977 | Clercq | |
| 4,021,983 A | 5/1977 | Kirk, Jr. | |
| 4,029,350 A | 6/1977 | Goupy et al. | |
| 4,056,878 A | 11/1977 | Woodley | |
| 4,227,593 A | 10/1980 | Bricmont et al. | |
| 4,249,976 A | 2/1981 | Hudson | |
| 4,352,484 A | 10/1982 | Gertz et al. | |
| 4,364,216 A | 12/1982 | Koller | |
| 5,242,735 A | 9/1993 | Blankenburg et al. | |
| 5,271,204 A | 12/1993 | Wolf et al. | |
| 5,431,445 A | 7/1995 | Wheatley | |
| 5,480,189 A | 2/1996 | Schechter | |
| 5,618,633 A | 4/1997 | Swanson et al. | |
| 5,729,463 A | 3/1998 | Koenig et al. | |
| 5,913,565 A | 6/1999 | Watanabe | |
| 6,068,330 A | 5/2000 | Kasuga et al. | |
| 6,179,355 B1 | 1/2001 | Chou et al. | |
| 6,371,540 B1 | 4/2002 | Campanella et al. | |
| 6,523,576 B2 | 2/2003 | Imaeda et al. | |
| 6,588,830 B1 | 7/2003 | Schmidt et al. | |
| 6,705,653 B2 | 3/2004 | Gotanda et al. | |
| 6,752,451 B2 | 6/2004 | Sakamoto et al. | |
| 6,799,794 B2 | 10/2004 | Mochidome et al. | |
| 6,893,065 B2 | 3/2005 | Seksaria et al. | |
| 7,044,515 B2 | 5/2006 | Mooijman et al. | |
| 7,160,621 B2 | 1/2007 | Chaudhari et al. | |
| 7,252,314 B2 | 8/2007 | Tamura et al. | |
| 7,264,274 B2 | 9/2007 | Ridgway | |
| 7,303,219 B2 | 12/2007 | Trabant et al. | |
| 7,350,851 B2 | 4/2008 | Barvosa-Carter et al. | |
| 7,357,445 B2 | 4/2008 | Gross et al. | |
| 7,407,219 B2 | 8/2008 | Glasgow et al. | |
| 7,445,097 B2 | 11/2008 | Tamura et al. | |
| 7,678,440 B1 | 3/2010 | McKnight et al. | |
| 7,896,411 B2 | 3/2011 | Kano et al. | |
| 7,926,160 B2 | 4/2011 | Zifferer et al. | |
| 7,926,865 B2 | 4/2011 | Terada et al. | |
| 7,988,809 B2 | 8/2011 | Smith et al. | |
| 8,336,933 B2 | 12/2012 | Nagwanshi et al. | |
| 8,354,175 B2 | 1/2013 | Impero | |
| 8,438,808 B2 | 5/2013 | Carlson et al. | |
| 8,459,726 B2 | 6/2013 | Tyan et al. | |
| 8,469,416 B2 | 6/2013 | Haneda et al. | |
| 8,539,737 B2 | 9/2013 | Tyan et al. | |
| 8,573,571 B2 | 11/2013 | Langhorst et al. | |
| 8,641,129 B2 | 2/2014 | Tyan et al. | |
| 8,659,659 B2 | 2/2014 | Bradai et al. | |
| 9,073,582 B2 | 7/2015 | Tyan et al. | |
| 9,174,678 B2 | 11/2015 | Tyan et al. | |
| 9,187,127 B2 | 11/2015 | Tyan et al. | |
| 9,365,245 B2 | 6/2016 | Donabedian et al. | |
| 2002/0059087 A1 | 5/2002 | Wahlbin et al. | |
| 2002/0153719 A1 | 10/2002 | Taguchi | |
| 2003/0085592 A1 | 5/2003 | Seksaria et al. | |
| 2005/0028710 A1 | 2/2005 | Carpenter et al. | |
| 2006/0033363 A1 | 2/2006 | Hillekes et al. | |
| 2006/0181072 A1 | 8/2006 | Tamura et al. | |
| 2006/0202493 A1 | 9/2006 | Tamura et al. | |
| 2006/0202511 A1 | 9/2006 | Tamura et al. | |
| 2006/0249342 A1 | 9/2006 | Canot et al. | |
| 2007/0056819 A1 | 3/2007 | Kano et al. | |
| 2007/0114804 A1 | 5/2007 | Gross et al. | |
| 2008/0012386 A1 | 1/2008 | Kano et al. | |
| 2008/0014809 A1 | 1/2008 | Brown et al. | |
| 2008/0030031 A1 | 2/2008 | Nilsson et al. | |
| 2008/0036242 A1 | 2/2008 | Glance et al. | |
| 2008/0098601 A1 | 5/2008 | Heinz et al. | |
| 2008/0106107 A1 | 5/2008 | Tan et al. | |
| 2008/0164864 A1 | 7/2008 | Bjorn | |
| 2008/0185852 A1 | 9/2008 | Suzuki et al. | |
| 2008/0217935 A1 | 9/2008 | Braunbeck et al. | |
| 2009/0026777 A1 | 1/2009 | Schmid et al. | |
| 2009/0085362 A1 | 4/2009 | Terada et al. | |
| 2009/0092820 A1 | 4/2009 | Lambers | |
| 2009/0102234 A1 | 4/2009 | Heatherington et al. | |
| 2009/0174219 A1 | 7/2009 | Foreman | |
| 2009/0236166 A1 | 9/2009 | Kowaki et al. | |
| 2010/0064946 A1 | 3/2010 | Watson | |
| 2010/0066124 A1 | 3/2010 | Terada et al. | |
| 2010/0072788 A1 | 3/2010 | Tyan et al. | |
| 2010/0102592 A1 | 4/2010 | Tyan et al. | |
| 2010/0164238 A1 | 7/2010 | Nakanishi et al. | |
| 2011/0012389 A1 | 1/2011 | Kanaya et al. | |
| 2011/0015902 A1 | 1/2011 | Cheng et al. | |
| 2011/0024250 A1 | 2/2011 | Kitashiba et al. | |
| 2011/0102592 A1 | 5/2011 | Bradai et al. | |
| 2011/0187135 A1 | 8/2011 | Kano et al. | |
| 2012/0205927 A1 | 8/2012 | Asakawa et al. | |
| 2012/0261949 A1 | 10/2012 | Tyan et al. | |
| 2013/0140850 A1* | 6/2013 | Tyan ................... | B21D 35/006 296/187.03 |
| 2013/0193699 A1 | 8/2013 | Zannier | |
| 2013/0221692 A1 | 8/2013 | Wang et al. | |
| 2013/0292968 A1 | 11/2013 | Tyan et al. | |
| 2013/0300138 A1 | 11/2013 | Banasiak et al. | |
| 2013/0341115 A1 | 12/2013 | Tyan et al. | |
| 2014/0021709 A1 | 1/2014 | Hirose et al. | |
| 2014/0127454 A1 | 5/2014 | Küppers | |
| 2014/0203577 A1 | 7/2014 | Nagwanshi et al. | |
| 2014/0261949 A1 | 9/2014 | Marella et al. | |
| 2014/0353990 A1 | 12/2014 | Ishitobi et al. | |
| 2015/0001866 A1 | 1/2015 | Noyori | |
| 2015/0084374 A1 | 3/2015 | Tyan et al. | |
| 2015/0197206 A1 | 7/2015 | Tamura et al. | |
| 2015/0314743 A1 | 11/2015 | Matsushiro | |
| 2016/0001725 A1 | 1/2016 | Nakanishi et al. | |
| 2016/0001726 A1 | 1/2016 | Keller et al. | |
| 2016/0052557 A1 | 2/2016 | Tyan et al. | |
| 2016/0068194 A1 | 3/2016 | Tyan et al. | |
| 2016/0129866 A1 | 5/2016 | Kamiya | |
| 2016/0221521 A1 | 8/2016 | Nishimura et al. | |
| 2016/0264083 A1 | 9/2016 | Ishitsuka | |
| 2016/0375935 A1 | 12/2016 | Tyan et al. | |

FOREIGN PATENT DOCUMENTS

| | | |
|---|---|---|
| CN | 104890308 A | 9/2015 |
| CN | 105235616 A | 1/2016 |
| DE | 102009035782 A1 | 3/2010 |
| EP | 0856681 A1 | 8/1998 |
| FR | 2375496 A2 | 7/1978 |
| GB | 1123337 A | 8/1968 |
| JP | 08-337183 | 12/1996 |
| JP | 3897542 B2 | 1/2007 |
| JP | 2008-168745 A | 7/2008 |
| JP | 2008261493 A | 10/2008 |
| JP | 2009184417 A | 8/2009 |
| JP | 04-371059 | 11/2009 |
| JP | 2011051581 A | 3/2011 |
| JP | 2012107660 A | 6/2012 |
| JP | 2013-159132 A | 8/2013 |
| JP | 5348910 B2 | 8/2013 |
| JP | 2014004973 A | 1/2014 |
| JP | 2015124784 A | 7/2015 |

(56) References Cited

FOREIGN PATENT DOCUMENTS

| RU | 2246646 C2 | 10/2004 |
|---|---|---|
| WO | 92/09766 A1 | 6/1992 |

OTHER PUBLICATIONS

PABR filed on Mar. 17, 2016 PABR in Response to NFOA dated Dec. 17, 2015 from U.S. Appl. No. 12/891,801.
Machine translation for JP08-337183.
JP08-337183 English Abstract.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Yoshioka Nakazawa et al., "Development of Crash-Box for Passenger Car With High Capability for Energy Absorption", VIII International Conference on Computation Plasticity (COMPLAS VIII), Barcelona, 2005.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
DOfice Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 11, 2011 Response to Office Action dated Aug. 19, 2011 from U.S. Appl. No. 12/233,808.
Office Action dated Mar. 7, 2012 from U.S. Appl. No. 12/233,808.
Jun. 6, 2012 Response to Office Action dated Mar. 7, 2012 from U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Office Action dated Dec. 17, 2015 from U.S. Appl. No. 12/891,801.
Non-Final Office Action dated Feb. 22, 2017 from U.S. Appl. No. 15/078,517.
Notice of Allowance dated Jun. 5, 2017 from U.S. Appl. No. 15/078,517.
Non-Final Office Action dated Mar. 17, 2017 from U.S. Appl. No. 14/749,426.
Non-Final Office Action dated Feb. 7, 2017 from U.S. Appl. No. 14/923,802.
Final Office Action dated Jul. 10, 2017 from U.S. Appl. No. 14/749,426.
Notice of Allowance dated Aug. 24, 2016 issued in co-pending U.S. Appl. No. 12/891,801.
Non-Final Office Action dated Nov. 1, 2016 issued in co-pending U.S. Appl. No. 14/930,299.
Non-Final Office Action dated Jan. 23, 2017 issued in co-pending U.S. Appl. No. 14/942,385.
Final Office Action dated May 16, 2017 issued in co-pending U.S. Appl. No. 14/930,299.
Final Office Action dated May 15, 2017 issued in co-pending U.S. Appl. No. 14/942,385.

* cited by examiner $L_{sj}$ = LENGTH OF STRAIGHT SIDE j   $\theta_{ij}$ = INTERNAL ANGLE j   $R_j$ = RADIUS OF CURVED SIDE j
$T_{sj}$ = THICKNESS OF STRAIGHT SIDE j   $T_{cj}$ = THICKNESS OF CURVED SIDE j   $L_{cj}$ = LENGTH OF CURVED SIDE j = $\pi R_j$

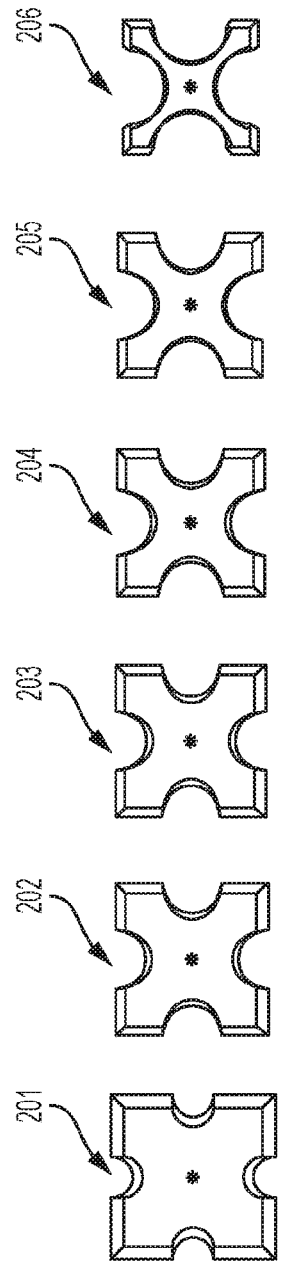
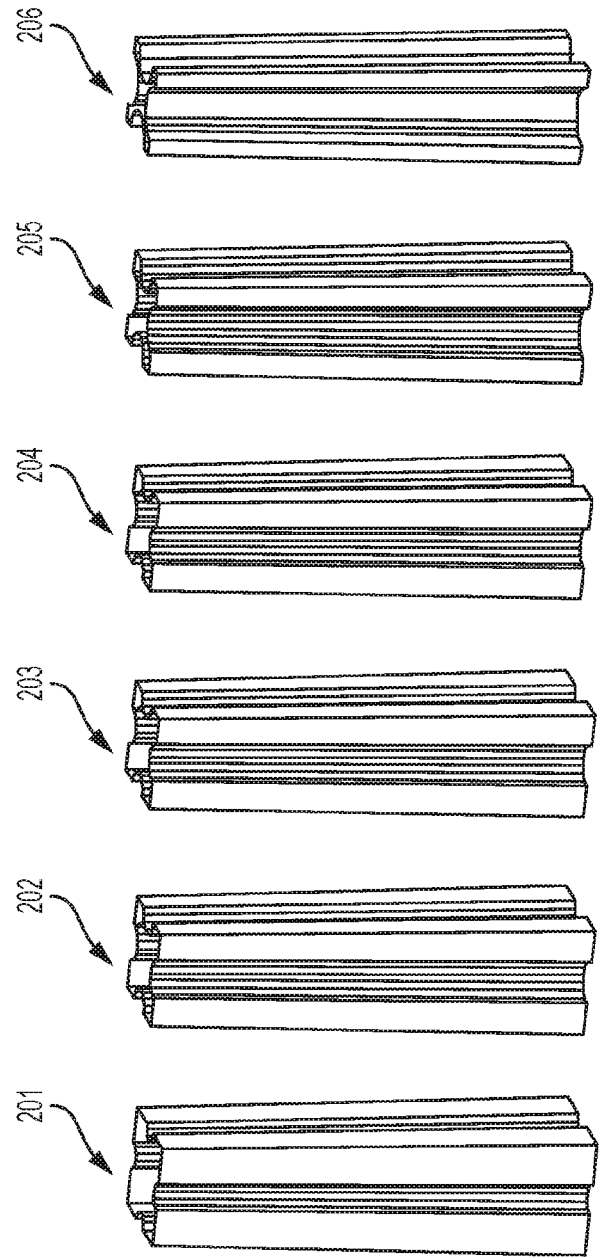

TWELVE-CORNERED STRENGTHENING MEMBER FOR A VEHICLE WITH STRAIGHT AND CURVED SIDES AND AN OPTIMIZED STRAIGHT SIDE LENGTH TO CURVED SIDE RADIUS RATIO

TECHNICAL FIELD

The present disclosure relates generally to a strengthening member for a vehicle body or other structures. The present disclosure relates more specifically to a strengthening member having a twelve-cornered cross section with eight straight sides and four curved sides and to motor vehicles including a strengthening member having a twelve-cornered cross section with eight straight sides and four curved sides.

BACKGROUND

It is desirable, for vehicle strengthening members, to maximize impact energy absorption and bending resistance while minimizing mass per unit length of the strengthening member. Impact energy absorption may be maximized, for example, by assuring that the strengthening member compacts substantially along a longitudinal axis of the strengthening member upon experiencing an impact along this axis. Such longitudinal compaction may be referred to as a stable axial crush of the strengthening member.

When a compressive force is exerted on a strengthening member, for example, by a force due to a front impact load on a vehicle's front rail or other strengthening member in the engine compartment, the strengthening member can crush in a longitudinal direction to absorb the energy of the collision. In addition, when a bending force is exerted on a strengthening member, for example, by a force due to a side impact load on a vehicle's front side sill, B-pillar or other strengthening member, the strengthening member can bend to absorb the energy of the collision.

Conventional strengthening members rely on increasing the thickness and hardness of side and/or corner portions to improve crush strength. However, such increased thickness and hardness increases weight of the strengthening member and reduces manufacturing feasibility. It may be desirable to provide a strengthening assembly configured to achieve the same or similar strength increase as provided by the thickened sides and/or corners, while minimizing mass per unit length of the member, and maintaining a high manufacturing feasibility.

It may further be desirable to provide a strengthening member that can achieve increased energy absorption and a more stable axial collapse when forces such as front and side impact forces are exerted on the strengthening member, while also conserving mass to reduce vehicle weights and meet emission requirements. Also, it may be desirable to provide a strengthening member that can achieve improved energy absorption and bend when a bending force is exerted on the strengthening member. Additionally, it may be desirable to provide a strengthening member that possesses improved noise-vibration-harshness performance due to work hardening on its corners. In addition, it may be desirable, to provide a twelve-cornered strengthening member cross section with eight straight sides and four curved sides that is configured to achieve strength increases (i.e., load carrying and energy absorption) over other twelve-cornered strengthening member cross section designs, while also allowing flexibility in design to meet a range of vehicle applications.

SUMMARY

In accordance with various exemplary embodiments of the present disclosure a strengthening member for a vehicle is provided. The strengthening member has a twelve-cornered cross section including sides and corners. The sides include eight straight sides and four curved sides. A length of each straight side of the cross section is the substantially the same, a radius of a curvature of each curved side of the cross section is substantially the same, and a ratio of the straight side length to the curvature radius ranges from about 0.9 to about 1.6.

In accordance with another aspect of the present disclosure, method for manufacturing a strengthening member for an automotive vehicle is provided. The strengthening member has a twelve-cornered cross section that includes eight straight sides and four curved sides, and a length of each straight side of the cross section is the same, a radius of a curvature of each curved side of the cross section is the same. Method steps include fabricating one or more sections of the strengthening member and tuning the ratio of the straight side length to the curvature radius to be about 0.9 to about 1.6.

In accordance with a further aspect of the present disclosure, a vehicle that includes a strengthening member is provided. The strengthening member has a twelve-cornered cross section that includes sides and corners. The sides include eight straight sides and four curved sides. A length of each straight side of the cross section is the substantially the same and a radius of a curvature of each curved side of the cross section is substantially the same. The length of each straight side ranges from about 10 mm to about 200 mm and the radius of the curvature of each curved side ranges from about 3 mm to about 400 mm.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 2A illustrates a top view of a first exemplary embodiment of strengthening member having a twelve-cornered cross section, with eight straight sides and four curved sides in accordance with the present teachings;

FIG. 2B illustrates a top view of a second exemplary embodiment of strengthening member having a twelve-cornered cross section, with eight straight sides and four curved sides in accordance with the present teachings;

FIG. 2C illustrates a top view of a third exemplary embodiment of strengthening member having a twelve-cornered cross section, with eight straight sides and four curved sides in accordance with the present teachings;

FIG. 2D illustrates a top view of a fourth exemplary embodiment of strengthening member having a twelve-cornered cross section, with eight straight sides and four curved sides in accordance with the present teachings;

FIG. 2E illustrates a top view of a fifth exemplary embodiment of strengthening member having a twelve-cornered cross section, with eight straight sides and four curved sides in accordance with the present teachings;

FIG. 2F illustrates a top view of a sixth exemplary embodiment of strengthening member having a twelve-cornered cross section, with eight straight sides and four curved sides in accordance with the present disclosure;

FIG. 3A illustrates a perspective view of the strengthening member of FIG. 2A;

FIG. 3B illustrates a perspective view of the strengthening member of FIG. 2B;

FIG. 3C illustrates a perspective view of the strengthening member of FIG. 2C;

FIG. 3D illustrates a perspective view of the strengthening member of FIG. 2D;

FIG. 3E illustrates a perspective view of the strengthening member of FIG. 2E;

FIG. 3F illustrates a perspective view of the strengthening member of FIG. 2F;

Figure 1:
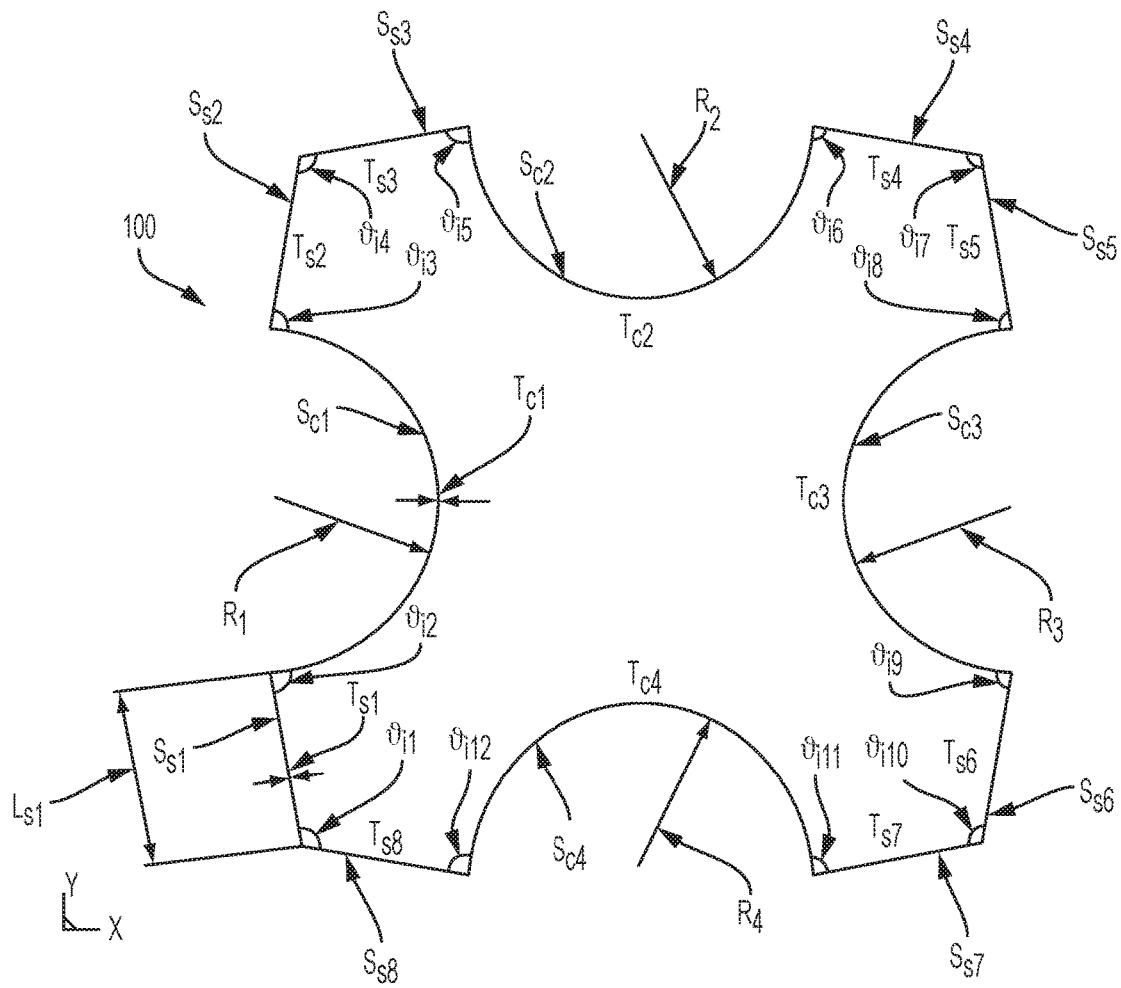
FIG. 1 illustrates an exemplary embodiment of a twelve-cornered cross section, with eight straight sides and four curved sides, for a strengthening member in accordance with the present teachings.
Figure 4F:
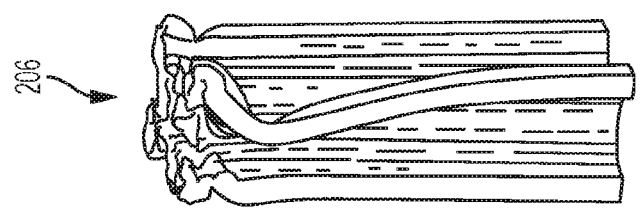
FIGS. 4A-4F illustrate exemplary quasi-static axial collapse of the strengthening members shown in FIGS. 3A-3F, respectively.
Figure 4E:
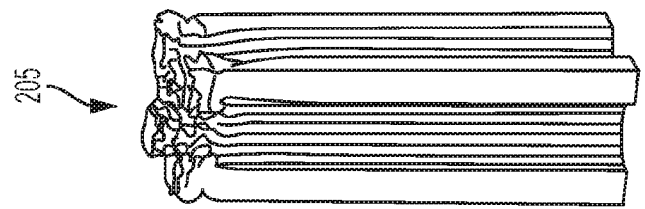
Figure 4D:
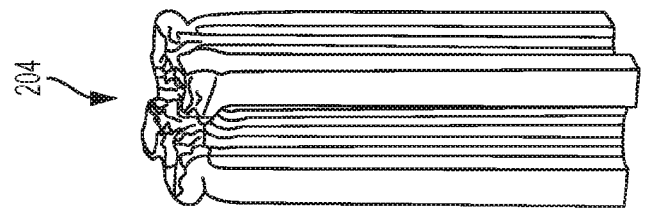
Figure 4C:
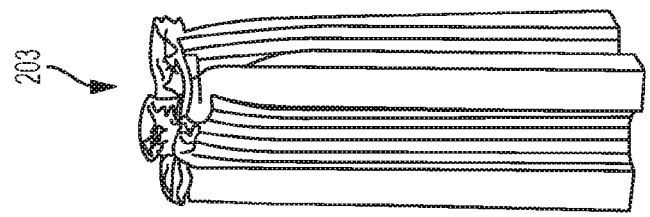
Figure 4B:
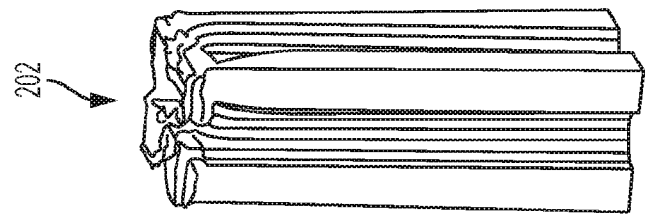
Figure 4A:
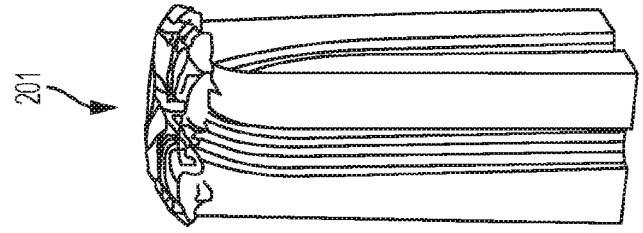

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

The present teachings contemplate strengthening members with twelve-cornered cross sections having substantially increased stiffness throughout the sides and corners without increasing thickness within the corners as done in conventional strengthening members. The strengthening members of the present disclosure are designed based in part on, for example, a variety of tunable parameters configured to achieve strength increases (i.e., load carrying and energy absorption) over basic polygonal designs (e.g., polygonal strengthening member cross sections having less or the same number of sides), while also allowing design flexibility to meet a range of vehicle applications.

In accordance with the present teachings, the shape of the strengthening members disclosed herein provides the strengthening member with stabilized folding, reduced crush distance, and increased energy absorption in response to an axially applied crash force. The shape permits a more customized fit with other vehicle components.

The strengthening members in accordance with the present teachings can achieve increased energy absorption and a more stable axial collapse when forces such as front and side impact forces are exerted on the strengthening member. Furthermore, the side lengths and configurations, and/or degrees of the internal and external angles, of the strengthening members in accordance with the present teachings can achieve a similar, if not greater, strength increase as thickened corners, while minimizing mass per unit length of the member and maintaining a high manufacturing feasibility because the member can be formed by stamping, bending, press forming, hydro-forming, molding, casting, extrusion, uniform or non-uniform roll forming, machining, forging, and/or other known manufacturing processes. Thus-formed sections can be joined via welding, brazing, soldering, adhesive bonding, fastening, press fitting or other known joining technologies.

Strengthening members in accordance with the present teachings can comprise, for example, steel alloys, titanium alloys, aluminum alloys, magnesium alloys, nylons, plastics, polymers, composites, fiber-reinforced composites, hybrid materials (i.e., multiple dissimilar materials), shape-memory materials, or any other suitable materials. Those of ordinary skill in the art would understand, for example, that the material used for a strengthening member may be chosen based at least in part on intended application, strength/weight considerations, cost, packaging space, and/or other design factors.

A strengthening member in accordance with the present teachings may comprise a twelve-cornered cross section having eight straight sides and four curved sides. An exemplary embodiment of a twelve-cornered cross section 100 for a strengthening member in accordance with the present teachings is illustrated in FIG. 1. As illustrated, the cross section 100 comprises eight straight sides $S_{s1}$-$S_{s8}$ having lengths $L_{s1}$-$L_{s8}$ and thicknesses $T_{s1}$-$T_{s8}$; four curved sides $S_{c1}$-$S_{c4}$ having lengths $L_{c1}$-$L_{c4}$, thicknesses $T_{c1}$-$T_{c4}$, and a radius of curvature $R_1$-$R_4$; and twelve internal corners with angles $\vartheta_{i1}$-$\vartheta_{i12}$.

The side lengths and the thicknesses and internal corner angles can be varied (i.e., tuned) to achieve enhanced strength and other performance features (e.g., stability of folding pattern) compared to other twelve sided cross-sections. Tuning of parameters that improves strength can permit wall and/or corner thickness, thus achieving reduced mass of the strengthening member. One aspect of the present design which may be tuned is the ratio between the length of the straight sides and the length of the curved sides.

In accordance with one exemplary embodiment, for example, each of the straight side lengths $L_{s1}$-$L_{s8}$ of the cross section 100 may be substantially the same. Making all of the straight side lengths $L_{s1}$-$L_{s8}$ substantially the same can provide a strengthening member with desirable manufacturability. Where the straight side lengths $L_{s1}$-$L_{s8}$ are kept substantially the same in this manner, the length of the straight sides may be referred to collectively as $L_s$. In certain embodiments of the present teachings, for example, a length of each straight side ($L_{s1}$-$L_{s8}$) can range from about 10 mm to about 200 mm and a length of each circular side ($L_{c1}$-$L_{c4}$) can range from about 9 mm to about 1200 mm. In certain additional embodiments, a thickness of the sides and corners can range from about 0.7 mm to about 6.0 mm; and in certain embodiments, the thickness of the sides is substantially the same as the thickness of the corners. Furthermore, in accordance with certain additional exemplary embodiments, the thickness of the strengthening member may vary, for example, within one side or from side to side to provide desirable overall axial crush and bending performance.

Additionally, each of the curved side radii $R_1$-$R_4$ may be substantially the same. Making all of the curved side radii $R_1$-$R_4$ substantially the same can further provide a strengthening member with desirable manufacturability. Where the curved side radii $R_1$-$R_4$ are kept substantially the same in this manner, the radius of the curved sides may be referred to collectively as $R_c$. In certain embodiments of the present teachings, for example, a radius of each curved side ($R_1$-$R_4$) can range from about 3 mm to about 400 mm. As shown in exemplary FIG. 1, the curved sides $S_{c1}$-$S_{c4}$ may be circular such that the curved side radius $R_c$ is the same when measured from any point along any curved side $S_{c1}$-$S_{c4}$. Making the curved sides $S_{c1}$-$S_{c4}$ circular can also improve the manufacturability of the strengthening member.

The disclosed size ranges for side lengths, curvature radii, and side thicknesses of a cross section of the strengthening member are contemplated to be generally applicable for strengthening members within automotive vehicles. Strengthening members having a cross section with side lengths, curvature radii, and side thicknesses outside of the above-disclosed ranges are also contemplated. Particularly, strengthening members used in certain applications, such as within aircrafts, spacecrafts, and watercrafts may have side lengths, curvature radii, and/or side thicknesses that are greater than the disclosed ranges.

In certain embodiments of the present teachings, each internal angle $\vartheta_{i1}$-$\vartheta_{i12}$ ranges from about 60 degrees to about 145 degrees. To further improve the manufacturability of the strengthening member, each internal angle $\vartheta_{i1}$-$\vartheta_{i12}$ may be substantially the same (see strengthening members 201-206 of FIGS. 2A-2F). Where the internal angles are kept substantially the same in this manner, the internal angle may be referred to collectively as the internal angle $\vartheta_i$. Making each of the internal angle $\vartheta_i$ substantially 90 degrees can provide even more desirable manufacturability. However, as shown in exemplary FIG. 1, at least one internal angle may differ from at least one other internal angle. For example, as shown in FIG. 1, internal angles $\vartheta_{i1}$, $\vartheta_{i4}$, $\vartheta_{i7}$, and $\vartheta_{i10}$ (about 111 degrees) may differ from internal angles $\vartheta_{i2}$, $\vartheta_{i3}$, $\vartheta_{i5}$, $\vartheta_{i6}$, $\vartheta_{i8}$, $\vartheta_{i9}$, $\vartheta_{i11}$, and $\vartheta_{i12}$ (about 93 degrees).

Where, as described above, the straight side lengths $L_{s1}$-$L_{s8}$ of the cross section are substantially the same and the curved side radii of curvature $R_1$-$R_4$ may be substantially the same, a straight-side-length-to-curved-side-radius ratio ("$L_s/R_c$ ratio") may be varied (i.e., tuned) to achieve improved strength and other performance features (e.g., crush stability, folding pattern, crush force, crush distance, and energy absorption) compared to existing twelve-sided cross sections with eight straight sides and four curved sides. This strength improvement further obviates the need for increased corner thickness, which is an additional benefit of fine-tuning the $L_s/R_c$ ratio of a strengthening member having a twelve-sided (i.e., twelve-cornered) cross section with eight straight sides and four curved sides.

Turning now to FIGS. 2A-2F, top views of exemplary embodiments of strengthening members 201-206 (respectively), each having a twelve-cornered cross section with eight straight sides of the same length, four curved sides each having the same radius, and a $L_s/R_c$ ratio ranging from about 0.6 to about 2.78 are shown, respectively.

As shown in FIGS. 2A-2F, for example, in accordance with various embodiments of the present teachings, the $L_s/R_c$ ratio of a cross section can be varied, for example in accordance with available packaging space within a vehicle. An additional, perspective view of each strengthening member 201-206 of FIGS. 2A-2F is shown in FIGS. 3A-3F, respectively. Note that strengthening members 201-206 are exemplary only, and are provided to illustrate how the $L_s/R_c$ ratio parameter can be utilized to modulate the cross section of the exemplary embodiment of FIG. 1 in order to arrive at a desirable cross section for a strengthening member. Thus, the present disclosure contemplates various twelve-cornered cross section configurations with eight straight sides and four curved sides and various $L_s/R_c$ ratios, which can be adjusted based on space requirements and/or to control strengthening member collapse modes. Note that a strengthening member with a uniform longitudinal taper (e.g., strengthening members 201-206) can have a cross sectional straight side length $L_s$ and curved side radius $R_c$ that varies along the longitudinal length of a strengthening member, but, for a cross section at any given point along the length of the strengthening member, all straight side lengths $L_{s1}$-$L_{s12}$ and curved side radii of curvature $R_1$-$R_4$ will be the same.

Strengthening members 201-206 are finite element models that were developed to investigate desirable $L_s/R_c$ ratios for strengthening members having a twelve-cornered cross section with eight straight sides and four curved sides. In particular, strengthening members 201-206 were developed to have substantially the same longitudinal length, substantially the same longitudinal angle of taper, substantially the same side and corner thicknesses, and the same material. Additionally, each strengthening member 201-206 has the same square outer dimension and mass. Since each strengthening member 201-206 has substantially the same mass and longitudinal length, each also has substantially the same mass-per-unit-length. Table 1 shows the straight side length $L_s$, curved side radius $R_c$, $L_s/R_c$ ratio, and perimeter size (P) for each strengthening member. Given that each curved side of the strengthening members 201-206 is semi-circular, for each cross section of each strengthening member 201-206, the curved side radius $R_c = L_c/\pi$. The perimeter size $P = 4\pi R_c + 8L_s$.

TABLE 1

Dimensions of modeled strengthening members 201-206.

| Strengthening Member Ref. | $L_s$ (Normalized Length) | $R_c$ (Normalized Length) | $L_s/R_c$ ratio | Perimeter Size (Normalized Length) |
|---|---|---|---|---|
| 201 | 27.80 | 10.00 | 2.78 | 348.0 |
| 202 | 21.51 | 14.00 | 1.54 | 348.0 |

TABLE 1-continued

Dimensions of modeled strengthening members 201-206.

| Strengthening Member Ref. | $L_s$ (Normalized Length) | $R_c$ (Normalized Length) | $L_s/R_c$ ratio | Perimeter Size (Normalized Length) |
|---|---|---|---|---|
| 203 | 20.00 | 15.00 | 1.33 | 348.0 |
| 204 | 18.37 | 16.00 | 1.15 | 348.0 |
| 205 | 16.80 | 17.00 | 0.99 | 348.0 |
| 206 | 12.10 | 20.00 | 0.60 | 348.0 |

To determine desirable ranges of $L_s/R_c$ ratio for strengthening members having a twelve-cornered cross section with eight straight sides and four curved sides, exemplary strengthening members 201-206 were modeled as described above and finite element experimental test runs were conducted, as shown and described below with reference to FIGS. 4-7.

Prior to designing and conducting the complex testing for which results are shown and described below, one of ordinary skill in the art would have expected that the strengthening members having a twelve-cornered cross section with eight straight sides and four curved sides and a relatively low $L_s/R_c$ ratio would have been most desirable. This is because strengthening members having a twelve-cornered cross section with indentations, such as, for example, those created by curved sides $S_c$, were known to provide improved performance over strengthening members with a square- or rectangular-shaped cross section. Therefore, one of ordinary skill would have expected that a strengthening member having a twelve-cornered cross section with eight straight sides and four curved sides and relatively larger indentations (i.e., a relatively lower $L_s/R_c$ ratio) would have provided better axial collapse and crush energy absorption than a twelve-cornered cross section with eight straight sides and four curved sides and relatively smaller indentations (i.e., a relatively higher $L_s/R_c$ ratio). In other words, one of ordinary skill would expected that a strengthening member having a relatively less square-shaped twelve-cornered cross section with eight straight sides and four curved sides (i.e., a relatively lower $L_s/R_c$ ratio) would have provided better axial collapse and crush energy absorption than a more square-shaped twelve-cornered cross section with eight straight sides and four curved sides (i.e., a relatively high $L_s/R_c$ ratio). It follows, that when comparing multiple strengthening members, each having a cross section with eight straight sides, four curved sides, and substantially the same size perimeter, with the material type and longitudinal dimensions being constant, one of ordinary skill would have expected that the strengthening member having the cross section with the lowest $L_s/R_c$ ratio (i.e., least square-shaped cross-section) would have provided the best axial collapse and crush energy absorption of all of the strengthening members.

The test runs for each member simulated an impact with the same boundary condition, rigid mass (e.g. an impactor), impact speed, and initial kinetic energy.

FIGS. 4A-4F show strengthening members 201-206, respectively, which have undergone a simulated quasi-static crush. During each quasi-static crush the impact speed is slow (e.g., 1 in/min). An impactor compresses the members with a controlled displacement. Therefore, all members reach the same crush distance at the same crush time. Thus, subjecting multiple strengthening members to a quasi-static crush provides a comparison of the folding length and the crush stability of the strengthening members. Although one of ordinary skill would have expected strengthening member 206 to demonstrate the best axial collapse out of all strengthening members 201-206, unexpectedly, as shown in FIGS. 4A-4F, the strengthening members 202-205 having $L_s/R_c$ ratios ranging from 0.99 to 1.54 (FIGS. 4B-4E, respectively) in accordance with the present teachings demonstrated the most stable axial collapse and the smallest folding length. As viewed from the perspective shown in FIGS. 4A and 4F, the front right quadrant of strengthening members 201 and 206 exhibited a particularly unstable folding pattern, which is an observable indication that 201 and 206 have a less stable, and thus less desirable, axial collapse than the other four strengthening members 202-205. For example, as shown in FIGS. 4B-4E, strengthening members 202-205 exhibited more progressive folding in the crushed portions of the strengthening member 202-205 and straighter un-crashed portions, which are both observable indications of a more stable axial collapse.

Figure 5F:
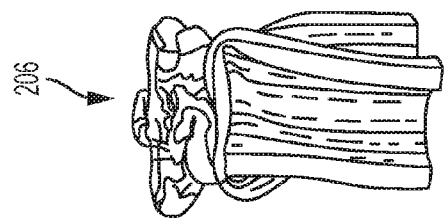
FIGS. 5A-5F illustrate exemplary dynamic crush of the strengthening members shown in FIGS. 3A-3F, respectively.
Figure 5E:
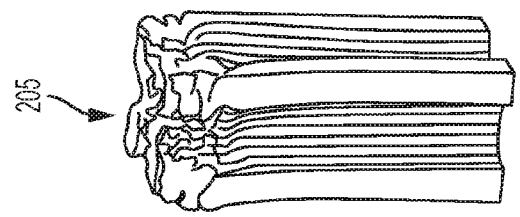
Figure 5D:
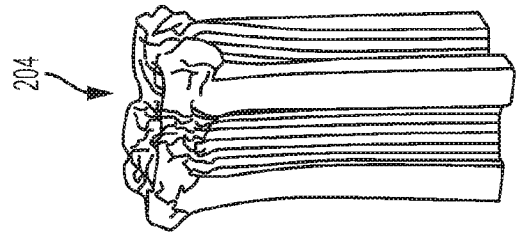
Figure 5C:
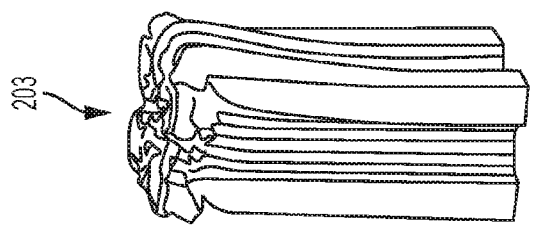
Figure 5B:
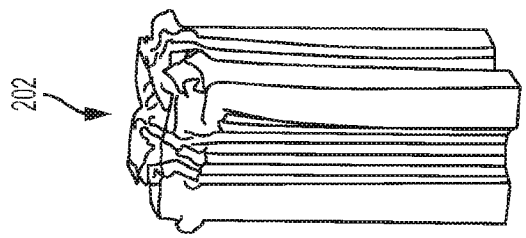
Figure 5A:
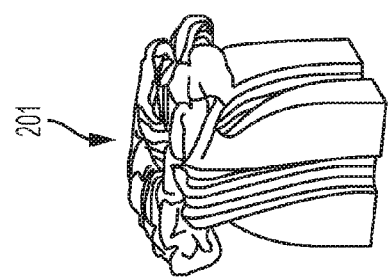

FIGS. 5A-5F show strengthening members 201-206, respectively, which have undergone a simulated dynamic crush. During each dynamic crush, the impactor is propelled by a gas gun with a designated mass and initial impact velocity which creates a designated initial kinetic energy. The initial kinetic energy crushes the members and the initial kinetic energy is transferred into the internal energy of the members. Performance of each strengthening member can be compared by measuring the crush distance, crush force, and specific energy absorption of each strengthening member. Unexpectedly, as shown in FIGS. 5A-5F, the strengthening members 202-205 having a cross section with an $L_s/R_c$ ratio ranging from 0.99 to 1.54 (FIGS. 5B-5E) in accordance with the present disclosure demonstrated the shorter crush distances than the strengthening member 206 having the least square-shaped cross section (FIG. 5F). A particularly surprising result was that the strengthening member 203 having a cross section with an $L_s/R_c$ ratio of 1.33 (FIG. 5C) in accordance with the present disclosure demonstrated shortest crush distance out of all of the strengthening members 201-206 that were simulated. Strengthening members 202, 204, and 205 (FIGS. 5B, 5D, and 5E, respectively) also had a significantly shorter crush distance than strengthening members, 201 and 206 (FIG. 5A and FIG. 5F).

Figure 6:
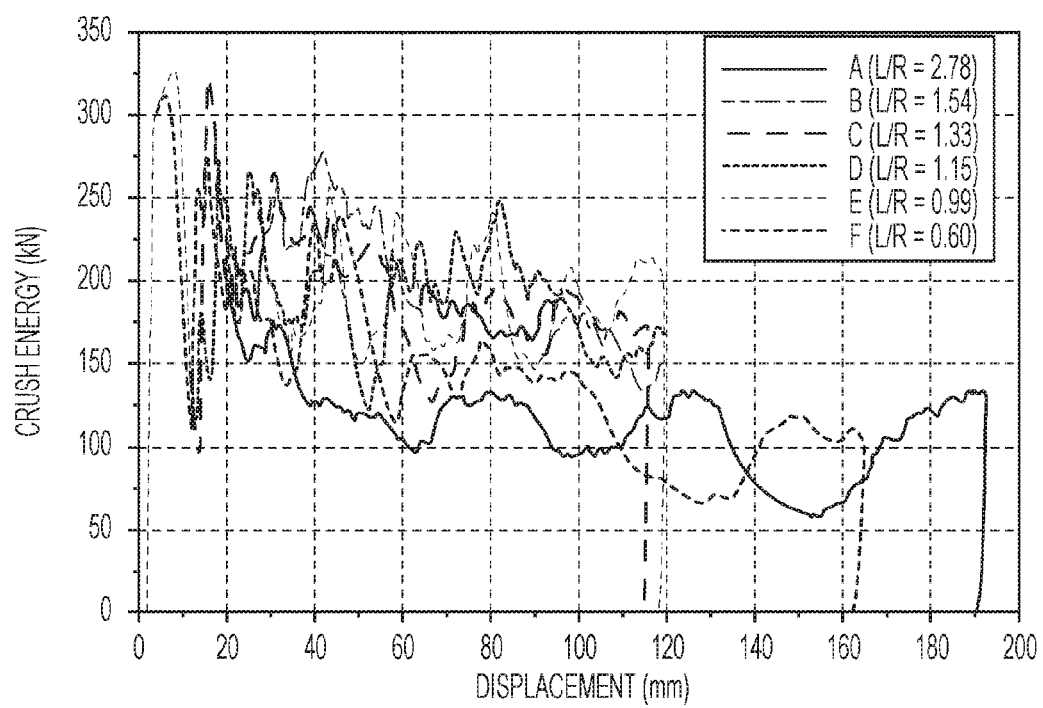
FIG. 6 is a graph of the dynamic crush force and associated crush distance for the exemplary strengthening members shown in FIGS. 3A-3F.

FIG. 6 illustrates the dynamic crush force (in kN) and associated axial crush distance (in mm) for the simulated dynamic crush, exerted axially on the exemplary strengthening members having the cross sections shown in FIG. 2A-2F. Unexpectedly, as shown in FIG. 6, the strengthening members 202-205 having a cross section with an $L_s/R_c$ ratio ranging from 0.99 to 1.54 could sustain a much higher crushing force for a given resulting crushing distance as compared with the strengthening member 206 with the least square twelve-cornered cross section. Specifically, the strengthening member 203 having a cross section with an $L_s/R_c$ ratio of 1.33 in accordance with the present disclosure achieved about a 20% increase in averaged crush force and/or crash energy absorption as compared with the strengthening member 206 with the least square-shaped twelve-cornered cross section. The strengthening member 203 also achieved about a 42% increase in averaged crush force and/or crash energy absorption as compared with the strengthening member 201 with the most square-shaped twelve-cornered cross section.

Figure 7:
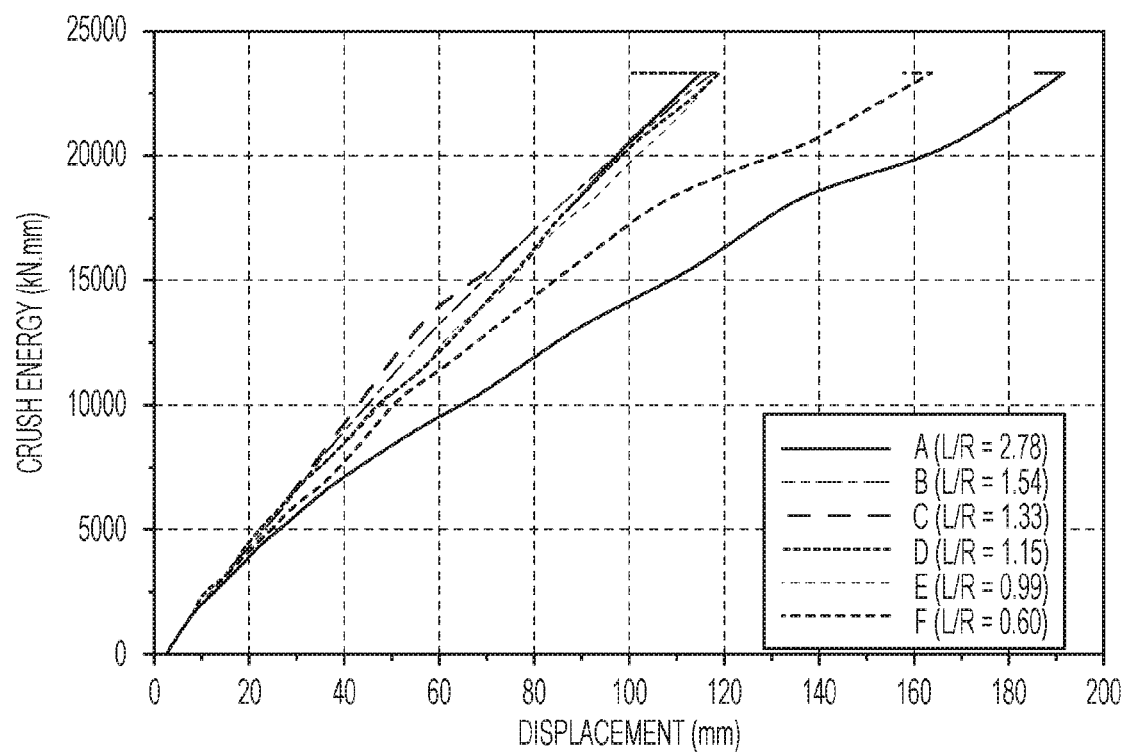
FIG. 7 is a graph of the dynamic axial crush energy and associated axial crush distance for the exemplary strengthening members shown in FIGS. 3A-3F.

FIG. 7 illustrates the dynamic axial crush energy (in kN-mm) and associated axial crush distance (in mm) for a simulated dynamic crush exerted on the exemplary strengthening members having the cross sections shown in FIG. 2A-2F. As shown in FIG. 7, the strengthening members

202-205 having a cross section with an $L_s/R_c$ ratio ranging from 0.99 to 1.54 could absorb the same total kinetic energy of the impact over a much shorter distance as compared with the strengthening members 201 with the most square-shaped twelve-cornered cross section and 206 with the least square-shaped twelve-cornered cross section. In particular, the strengthening member 203 having a cross section with an $L_s/R_c$ ratio of 1.33 in accordance with the present disclosure absorbed the full axial crush energy in about 72% of the axial crush distance as compared to the strengthening member 206 with the least square-shaped twelve-cornered cross section and in about 61.5% of the axial crush distance as compared to the strengthening member 201 with the most square-shaped twelve-cornered cross section.

Twelve-cornered cross sections in accordance with the present teachings may, therefore, allow improved impact energy management over, for example, basic polygonal strengthening member cross sections, including basic four-, six-, and eight-sided polygonal cross sections, while minimizing mass per unit length, provides mass saving solutions that reduce vehicle weight and meet new Corporate Average Fuel Economy (CAFE) and emission standards.

Beyond the increased load carrying and energy absorption capabilities, strengthening members in accordance with the present disclosure may provide additional advantages or benefits such as improved moisture shedding abilities, increased bending energy absorption capacity, improved manufacturing feasibility, and better fitting of the shape amongst the other components of the complete device (e.g., vehicle, as noted above).

In addition, a twelve-cornered strengthening member in accordance with the present disclosure also may be tuned to accommodate unique packaging requirements for use in various vehicles. By virtue of the particular shape of the cross section of at least some of the twelve-cornered cross members, it may be easier to couple, bond, attach, or otherwise affix other device components to the strengthening member. Other device components can include, but are not limited to, engine mounts or transmission mounts.

Twelve-cornered strengthening members in accordance with the present disclosure are contemplated for use as structural members in a number of environments. For example, in a motor vehicle, a strengthening member as disclosed herein may be used, for example, as one or more of crush cans, front rails, mid-rails, rear rails, side rails, shotguns, cross members, roof structures, beltline tubes, door beams, pillars, rockers, internal reinforcements, and other components that can benefit from increased crash energy absorption or the other advantages described herein. In addition, the present teachings can be applied to both body-on-frame and unitized vehicles, or other types of structures.

Figure 8:
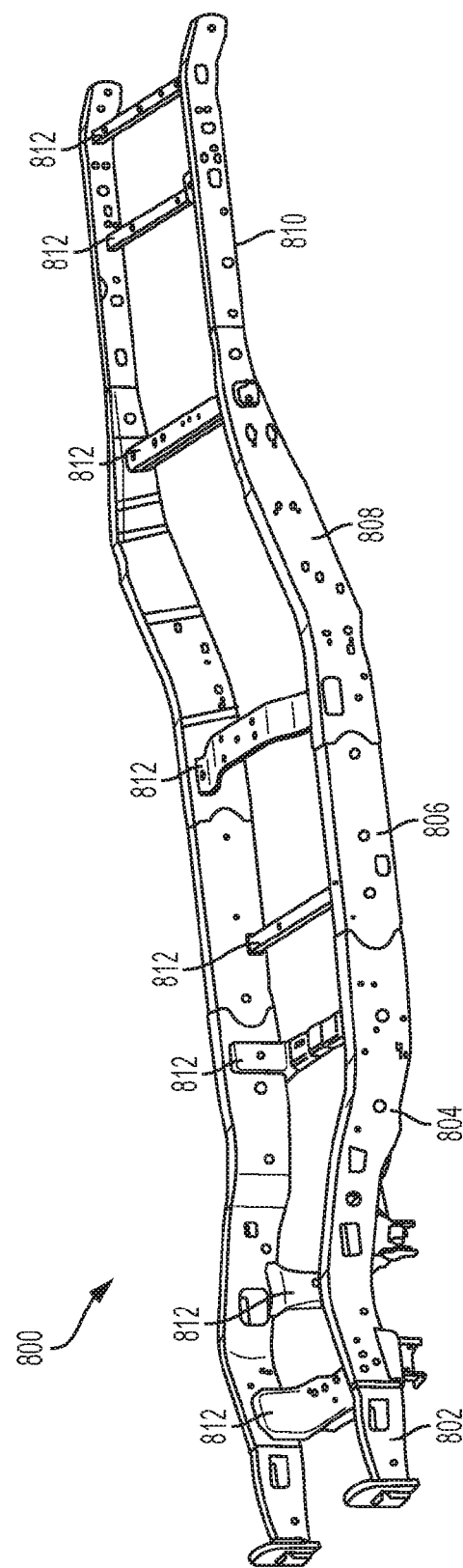
FIG. 8 illustrates an exemplary embodiment of a vehicle frame with several components for which a strengthening member in accordance with the present teachings can be used.
Figure 9:
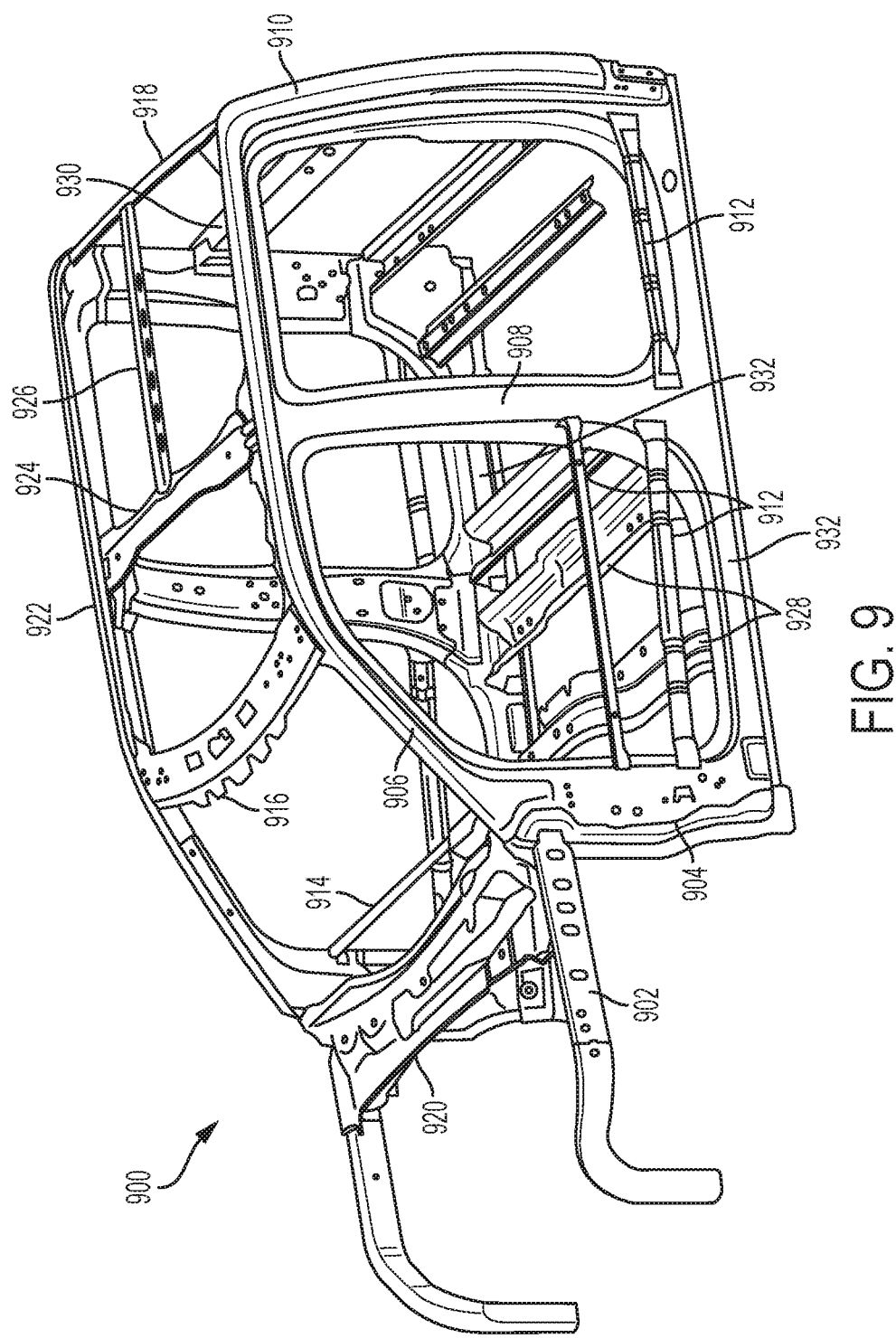
FIG. 9 illustrates an exemplary embodiment of a vehicle upper body with several components for which a strengthening member in accordance with the present teachings can be used.

For example, as shown in FIGS. 8 and 9, twelve-cornered strengthening members with eight straight sides and four curved sides in accordance with the present disclosure can be used to form part of or within a vehicle frame and/or a vehicle upper body. FIG. 8 illustrates an exemplary embodiment of a vehicle frame 800 with several components for which the strengthening can be used. For example, the strengthening members in accordance with the present disclosure may form or be used as a part of a front horn 802, a front rail 804, a front side rail 806, a rear side rail 808, a rear rail 810, and/or as one or more cross members 812. Likewise, FIG. 9 illustrates an exemplary embodiment of a vehicle upper body 900 with several components for which the strengthening can be used. For example, the strengthening members in accordance with the present disclosure may be formed or be used as a part of a shotgun 902, a hinge-pillar 904, an A-pillar 906, a B-pillar 908, a C-pillar 910, one or more door beams 912, a cross car beam 914, a front header 916, a rear header 918, a cow top 920, a roof rail 922, a lateral roof bow 924, longitudinal roof bow 926, one or more body cross members 928, a body cross member 930, and/or a rocker 932 (the lower horizontal member connecting hinge-pillar 904, B-pillar 908, and C-pillar 910).

Moreover, the strengthening members in accordance with the present disclosure may be used as or form a part of vehicle underbody components, for example, as a rocker and/or one or more underbody cross members. Also, the strengthening members in accordance with the present disclosure may be used as or form a part of vehicle engine compartment components, for example, as one or more engine compartment cross members.

Depending on the application, embodiments of the present teachings will have varied shapes (i.e. various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

Although various exemplary embodiments described herein have been described as configured to be used with automotive vehicles, it is envisioned that the various strengthening members in accordance with the present teachings may be configured for use with other types of vehicles (e.g. aircrafts, spacecrafts and watercrafts) and/or structures, for which it may be desirable to provide increased crash energy absorption. Thus, it will be appreciated by those of ordinary skill in the art having the benefit of this disclosure that the present teachings provide strengthening members for various applications. Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A strengthening member for a vehicle, the strengthening member comprising a twelve-cornered cross section including sides and corners, the sides comprising eight straight sides and four curved sides, wherein a length of each straight side is the substantially the same, a radius of a curvature of each curved side is substantially the same, and a ratio of the straight side length to the curvature radius ranges from about 0.9 to about 1.6.

2. The strengthening member of claim 1, wherein the ratio of the straight side length to the curvature radius ranges from about 1.30 to about 1.35.

3. The strengthening member of claim 1, wherein the ratio of the straight side length to the curvature radius is about 1.33.

4. The strengthening member of claim 1, wherein the curved sides are semi-circular.

5. The strengthening member of claim 1, wherein the curved sides are semi-elliptical.

6. The strengthening member of claim 1, wherein the sides and corners create twelve internal angles, wherein each internal angle is about 90 degrees.

7. The strengthening member of claim 1, wherein an outer dimension of the cross section is substantially square-shaped.

8. The strengthening member of claim 1, wherein an aspect ratio of the cross section is about 1.0.

9. The strengthening member of claim 1, wherein the radius of the curvature ranges from about 3 mm to about 400 mm.

10. The strengthening member of claim 1, wherein at least one side tapers along a longitudinal length of the strengthening member.

11. A method for manufacturing a strengthening member for an automotive vehicle, the strengthening member comprising a twelve-cornered cross section including eight straight sides and four curved sides, wherein a length of each straight side is the same, a radius of a curvature of each curved side is the same, the method comprising:
    fabricating one or more sections of the strengthening member; and
    tuning the ratio of the straight side length to the curvature radius to be about 0.9 to about 1.6.

12. The method of claim 11, further comprising tuning the ratio of the straight side length to the curvature radius to be about 1.3 to about 1.6.

13. The method of claim 11, tuning the ratio of the straight side length to the curvature radius to be about 1.30 to about 1.35.

14. The method of claim 11, wherein fabricating the one or more sections comprises stamping, pressing, hyrdroforming, molding, casting, forging, roll forming, and/or extruding each of the one or more sections.

15. The method of claim 11, further comprising fabricating the one or more sections from steel alloys, titanium alloys, aluminum alloys, magnesium alloys, nylons, plastics, polymers, composites, fiber-reinforced composites, shape memory materials, or a combination thereof.

16. The method of claim 11, further comprising joining the one or more sections by one or more of welding, brazing, soldering, press fitting, adhesion, and fastening.

17. A vehicle comprising:
    a strengthening member comprising a twelve-cornered cross section including sides and corners, the sides comprising eight straight sides and four curved sides, wherein a length of each straight side is the substantially the same and a radius of a curvature of each curved side is substantially the same;
    wherein the length of each straight side ranges from about 10 mm to about 200 mm and the radius of the curvature of each curved side ranges from about 3 mm to about 400 mm; wherein the ratio of the straight side length to the curvature radius ranges from about 0.9 to about 1.6.

18. The vehicle of claim 17, wherein the ratio of the straight side length to the curved side radius ranges from about 1.30 to about 1.35.

19. The vehicle of claim 18, wherein the sides and corners create twelve internal angles, wherein each internal angle is about 90 degrees.

20. The vehicle of claim 19, wherein an outer dimension of the cross section is substantially square-shaped.

\* \* \* \* \*